(12) United States Patent
Tsai et al.

(10) Patent No.: US 10,761,507 B2
(45) Date of Patent: Sep. 1, 2020

(54) INSTANT CORRECTION METHOD FOR ENCODER AND SYSTEM THEREOF

(71) Applicant: Delta Electronics, Inc., Taoyuan (TW)

(72) Inventors: Ching-Hsiung Tsai, Taoyuan (TW); Yu-Hua Chiao, Taoyuan (TW); Jeng-Ping Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/390,500

(22) Filed: Apr. 22, 2019

(65) Prior Publication Data
US 2020/0218226 A1    Jul. 9, 2020

(30) Foreign Application Priority Data

Jan. 4, 2019 (CN) .......................... 2019 1 0007597

(51) Int. Cl.
*G05B 19/29* (2006.01)
*G05B 19/404* (2006.01)

(52) U.S. Cl.
CPC .. *G05B 19/404* (2013.01); *G05B 2219/23329* (2013.01); *G05B 2219/37151* (2013.01)

(58) Field of Classification Search
CPC .................................................. G05B 19/404
USPC .......................................................... 318/602
See application file for complete search history.

(56) References Cited

U.S. PATENT DOCUMENTS

2011/0304482 A1\* 12/2011 Kapner ................. G01D 5/2448
                                                                341/13
2012/0143549 A1    6/2012 Ihm et al.
2013/0163654 A1\* 6/2013 Nakamura ......... G01D 5/24476
                                                                375/226
2013/0249452 A1\* 9/2013 Shinohara ............ G01D 5/2073
                                                                318/400.04
2018/0041231 A1    2/2018 Kondou

FOREIGN PATENT DOCUMENTS

EP    2144042 A2    1/2010
JP    2010164501 A    7/2010

OTHER PUBLICATIONS

Partial Search Report issued in corresponding EP application No. 19205789.1 dated May 7, 2020.(9 pages).

\* cited by examiner

*Primary Examiner* — Erick D Glass
(74) *Attorney, Agent, or Firm* — Muncy, Geissler, Olds & Lowe, P.C.

(57) ABSTRACT

An instant correction method for an encoder includes the following steps. The motion of a device under test is sensed to obtain a first wave signal and a second wave signal. The first and second wave signals are sampled to generate N first digital signal values and N second digital signal values. N positioning positions are generated according to the N first and second digital signal values, and the N positioning positions are added to a calculation group. A regression analysis is performed for the calculation group to generate a regression curve. The (N+1)-th prediction position is predicted using the regression curve. The ideal position of the device under test is determined at a time point of the (N+1)-th prediction position according to an ideal position curve. An error value between the (N+1)-th prediction position and the ideal position is applied to correct the device under test.

13 Claims, 6 Drawing Sheets

INSTANT CORRECTION METHOD FOR ENCODER AND SYSTEM THEREOF

CROSS REFERENCE TO RELATED APPLICATIONS

This application claims priority of China Patent Application No. 201910007597.5, filed on Jan. 4, 2019, the entirety of which is incorporated by reference herein.

BACKGROUND OF THE INVENTION

Field of the Invention

The present invention relates to an instant correction method for an encoder and a system thereof.

Description of the Related Art

Encoders mainly provide the precise position of a rotor (mover) in a servomotor to aid in stable speed control and precise positioning of a servo-driving device. However, any errors in the assembly of the mechanisms may affect the accuracy of the position output of the encoder. In addition, after a period of continuous use, the accuracy of the encoder position output decreases due to changes in the relative positions of the mechanisms, or the influence of pollution. Therefore, how to instantly calculate the error of the position output of the encoder and correct the position output is the current problem to be solved.

BRIEF SUMMARY OF THE INVENTION

The present invention provides an instant correction method for an encoder and a system thereof, thereby improving the accuracy of the encoder and extending the lifespan of the encoder, so as to increase its convenience of use.

The present invention provides an instant correction method for an encoder that includes the following steps. The motion of a device under test is sensed to obtain a first wave signal and a second wave signal, wherein the phase difference between the first wave signal and the second wave signal is 90 degrees. The first wave signal and the second wave signal are sampled to generate N first digital signal values and N second digital signal values. N positioning positions are generated according to the N first digital signal values and the N second digital signals values. The N positioning positions are added to a calculation group. A regression analysis is performed for the positioning positions in the calculation group to obtain a regression curve. (N+1)-th prediction position is predicted using the regression curve. The ideal position of the device under test is determined at a time point of the (N+1)-th prediction position according to an ideal position curve and an error value between the (N+1)-th prediction position and the ideal position is applied to correct the device under test.

In addition, the present invention provides an instant correction system for an encoder, which includes a sensing unit, a sampling unit and a processing unit. The sensing unit senses the motion of a device under test to obtain a first wave signal and a second wave signal, wherein the phase difference between the first wave signal and the second wave signal is 90 degrees. The sampling unit samples the first wave signal and the second wave signal to generate N first digital signal values and N second digital signal values. The processing unit generates N positioning positions according to the N first digital signal values and the N second digital signals values. The processing unit adds the N positioning positions to a calculation group. The processing unit performs a regression analysis of the positioning positions in the calculation group to obtain a regression curve. The processing unit predicts (N+1)-th prediction position using the regression curve. The processing unit determines the ideal position of the device under test at a time point of the (N+1)-th prediction position according to an ideal position curve and applies an error value between the (N+1)-th prediction position and the ideal position to correct the device under test.

According to the instant correction method for the encoder and the system thereof, the N positioning positions corresponding to the device under test are obtained. The regression analysis is performed for the N positioning positions to obtain the regression curve and further predict the (N+1)-th prediction position. The ideal position of the device under test is determined at the time point corresponding to the (N+1)-th prediction position according to the ideal position curve and the error value between the (N+1)-th prediction position and the corresponding ideal position is applied to correct the device under test. Therefore, the accuracy of the positioning position of the encoder may be effectively maintained at a certain range and the lifespan of the encoder may also be extended, thereby increasing the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Further areas to which the present device and method can be applied will become apparent from the detailed description provided herein. It should be understood that the detailed description and specific examples, while indicating exemplary embodiments of the instant correction system of the encoder and the method thereof, are intended for the purposes of illustration only and are not intended to limit the scope of the invention.

Figure 1:
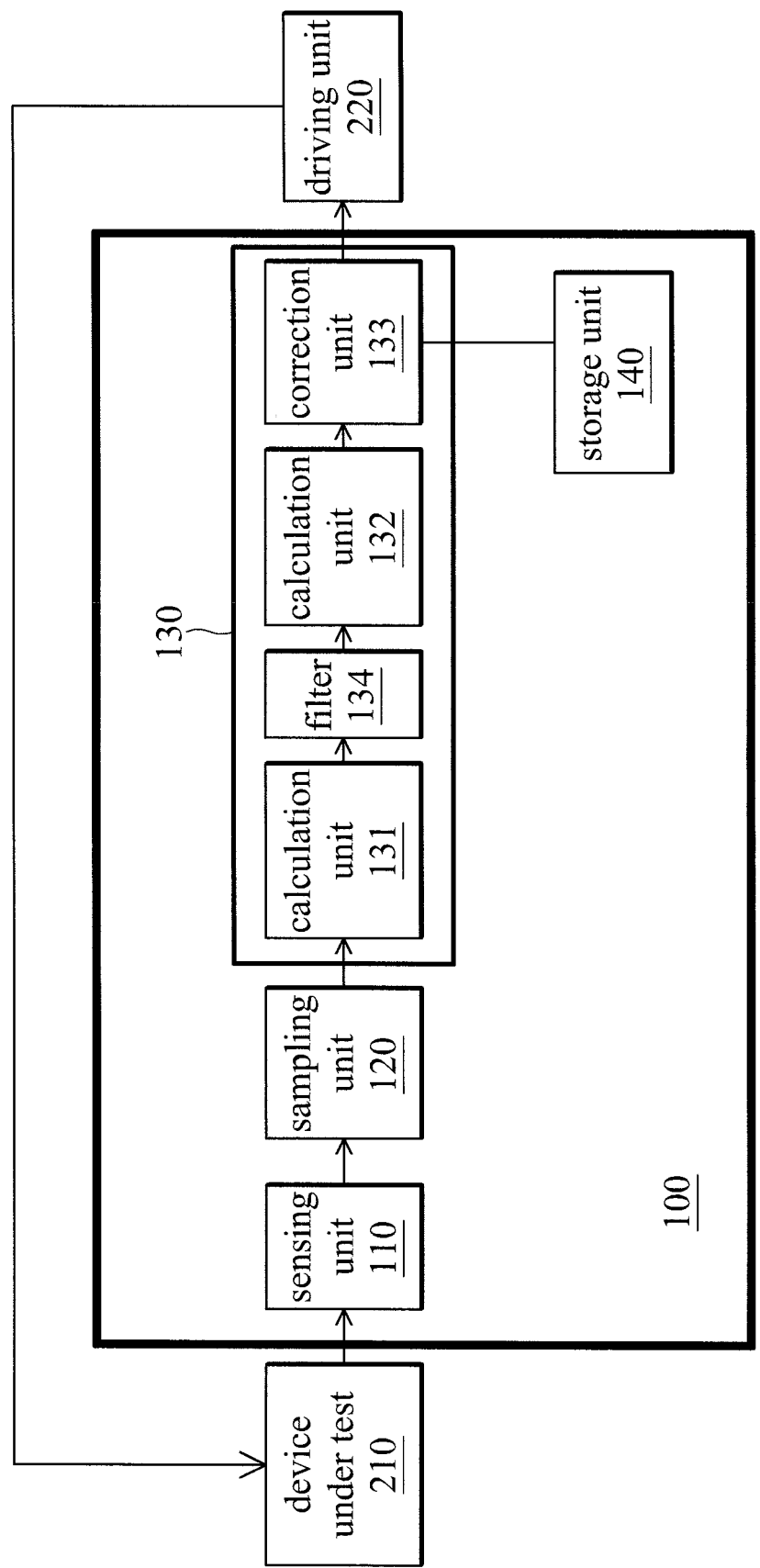
FIG. 1 shows a schematic view of an instant correction system for an encoder according to an embodiment of the present invention.

FIG. 1 shows a schematic view of an instant correction system for an encoder according to an embodiment of the present invention. The instant correction system for the encoder 100 of the embodiment is suitable for correct a device under test 210. The device under test 210 is various devices under test, such as a motor. Please refer to FIG. 1, the instant correction system for the encoder 100 includes a sensing unit 110, a sampling unit 120, a processing unit 130 and a storage unit 140.

The sensing unit 110 is connected to the device under test 210. The sensing unit 110 senses the motion of the device under test 210 to obtain a first wave signal and a second wave signal. In the embodiment, the phase difference between the first wave signal and the second wave signal is 90 degrees. The first wave signal is, for example, a sine (sin) signal, and the second wave signal, is for example, a cosine (cos) signal. In addition, the first wave signal and the second wave signal may be obtained when the device under test 210 starts to operate or after the device under test 210 operates for a period.

The sampling unit 120 is connected to the sensing unit 110. The sampling unit 120 samples the first wave signal and the second wave signal to generate N first digital signal values and N second digital signal values, wherein N is a positive integer greater than 1. In the embodiment, the sampling unit 120 is, for example, a high-speed signal sampler.

The processing unit 130 is, for example, a digital signal processor (DSP) or a field programmable gate array (FPGA). The processing unit 130 is connected to the sampling unit 120. The processing unit 130 generates N positioning positions according to the N first digital signal values and the N second digital signal values, wherein N is a positive integer greater than 1. In the embodiment, the processing unit 130 may generate the N positioning positions according to the N first digital signal values and the N second digital signal values through a coordinate rotation digital computer (CORDIC) algorithm or an inverse trigonometric function algorithm. Then, the processing unit 130 adds the N positioning positions to a calculation group and performs a regression analysis of the positioning positions in the calculation group to obtain a regression curve.

Afterward, the processing unit 130 predicts (N+1)-th prediction position using the regression curve. That is, the (N+1)-th prediction position corresponds to the prediction position of the next sampling point. Then, the processing unit 130 determines the ideal position of the device under test 210 at a time point of the (N+1)-th prediction position according to an ideal position curve. In the embodiment, the ideal position curve may be generated according to at least some of the N positioning positions in the calculation group.

Then, the processing unit 130 may apply an error value between the (N+1)-th prediction position and the ideal position to correct the device under test 210. For example, the processing unit 130 may output a driving signal to a driving unit 220 according to the error value. Therefore, the driving unit 220 may correct the device under test 210 according to the driving signal, so as to improving the position accuracy of the encoder.

In the embodiment, after the error value is applied to correct the device under test 210, the processing unit 130 may further obtain (N+1)-th positioning position. Then, the processing unit 130 may delete the first positioning position in the calculation group and add the (N+1)-th prediction position to the calculation group to update the calculation group. At this time, the calculation group includes the positioning positions from the second positioning position to the (N+1)-th positioning position.

Afterward, the processing unit 130 may repeat the regression analysis of the positioning positions (i.e., the second positioning position to (N+1)-th positioning position) in the calculation group to obtain the regression curve and predicts the (N+1)-th prediction position according to this regression curve. At this time, the (N+1)-th prediction position is a (N+2)-th prediction position. Then, the processing unit 130 may determine the ideal position of the device under test 210 at the time point of the (N+1)-th prediction position (i.e., the (N+2)-th prediction position) according to the ideal position curve. Afterward, the processing unit 130 may apply the error value between the (N+1)-th prediction position (i.e., the (N+2)-th prediction position) and the ideal position to correct the device under test 210.

Then, the processing unit 130 may further obtain (N+1)-th positioning position. At this time, the (N+1)-th positioning position is a (N+2)-th positioning position. Then, the processing unit 130 may delete the first positioning position in the calculation group and adds the (N+1)-th prediction position to the calculation group to update the calculation group. At this time, the calculation group includes the positioning positions from a third positioning position to the (N+2)-th positioning position.

Afterward, the processing unit 130 may repeat the regression analysis of the positioning positions (i.e., the third positioning position to (N+2)-th positioning position) in the calculation group to obtain the regression curve and predicts the (N+1)-th prediction position according to this regression curve. At this time, the (N+1)-th prediction position is a (N+3)-th prediction position. Then, the processing unit 130 may determine the ideal position of the device under test 210 at the time point of the (N+1)-th prediction position (i.e., the (N+3)-th prediction position) according to the ideal position curve. Afterward, the processing unit 130 may apply the error value between the (N+1)-th prediction position (i.e., the (N+3)-th prediction position) and the ideal position to correct the device under test 210. Other methods for correcting the device under test 210 and their operations may be discerned by analogy.

The storage unit 140 may be a non-volatile memory. The storage unit 140 is configured to store the N positioning positions corresponding to the description mentioned above, algorithms which are required to obtain various parameter values of the present invention, and error values and an error table for correcting the positioning position of the device under test 210.

In the embodiment, the processing unit 130 includes a calculation unit 131, a calculation unit 132 and a correction unit 133. The calculation unit 131 is connected to the sampling unit 120. The calculation unit 131 generates the N positioning positions according to the N first digital signal values and the N second digital signal values and adds the N positioning positions to the calculation group. In the embodiment, the calculation unit 131 generates the N positioning positions according to the N first digital signal values and the N second digital signal values and adds the N positioning positions to the calculation group through the coordinate rotation digital computer algorithm or an inverse trigonometric function algorithm. The calculation unit 132 is connected to the calculation unit 131. The calculation unit 132 receives the above calculation group and performs the regression analysis of the positioning positions in the calculation group to obtain the regression curve.

The correction unit 133 is connected to the calculation unit 132 and the storage unit 140. The correction unit 133 predicts the (N+1)-th prediction position using the regression curve. The correction unit 133 determines the ideal position of the device under test 210 at the time point of the (N+1)-th prediction position according to the ideal position curve and applies the error value between the (N+1)-th prediction position and the ideal position to correct the device under test 210. Then, the correction unit 133 may also store the error value between the (N+1)-th prediction position and the ideal position to the storage unit 140, so as to update the data stored by the storage unit 140, such as the error values and the error table.

In the embodiment, the processing unit 130 further includes a filter 134. The filter 134 is connected between the calculation unit 131 and the calculation unit 132. The filter134 is configured to perform a filtering process on the N positioning positions to filter the noises of the N positioning positions. The N filtered positioning positions are outputted to the calculation unit 132. Therefore, the effect that the regression curve generated by the calculation unit 132 is interfered by the noise to cause a larger calculation error may be avoided. In the embodiment, the filter 134 may be a low pass filter (LPF).

Figure 2A:
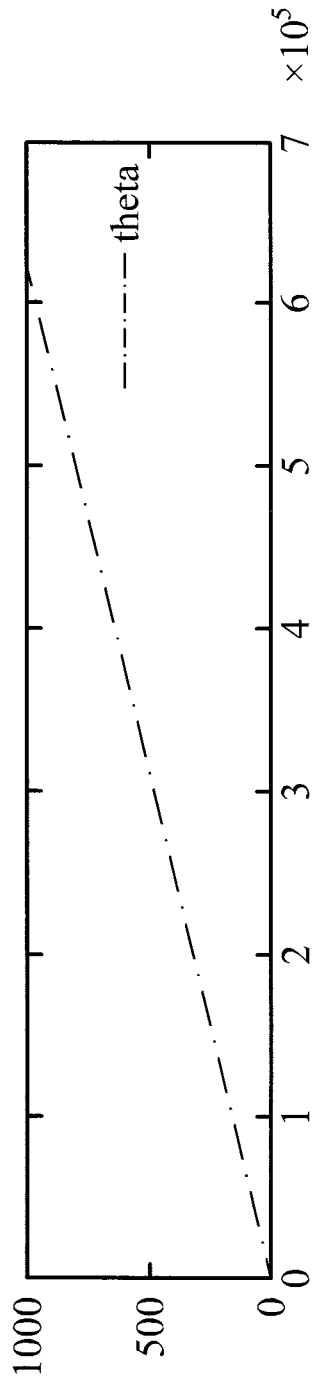
FIG. 2A shows a schematic view of an ideal position output of the encoder according to an embodiment of the present invention.
Figure 2B:
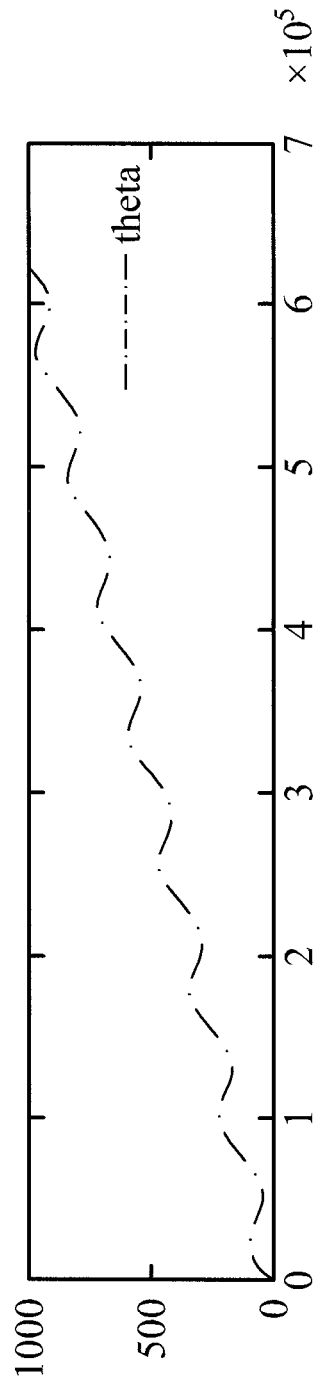
FIG. 2B shows a schematic view of an actual position output of the encoder according to an embodiment of the present invention.

FIG. 2A shows a schematic view of an ideal position output of the encoder according to an embodiment of the present invention. FIG. 2B shows a schematic view of an actual position output of the encoder according to an embodiment of the present invention. When the device under test 210 (such as the motor) is operated at a constant speed, the positional change of the device under test 210 in a short time may exhibit a linear change due to the mechanical inertia of the device under test 210, as shown in FIG. 2A.

However, as mentioned above, since the error is caused when the encoder is assembled with the device under test 210 or the encoder is affected by the external environment, the actual positioning position outputs of the encoder may have errors, as shown in FIG. 2B. In order to improve the accuracy of the positioning position outputs of the encoder, the embodiments of the present invention may predict the output position of the encoder, and obtains the error between the prediction position and the corresponding ideal position thereof according to an idea position curve, thereby improving the positioning accuracy.

Figure 3:
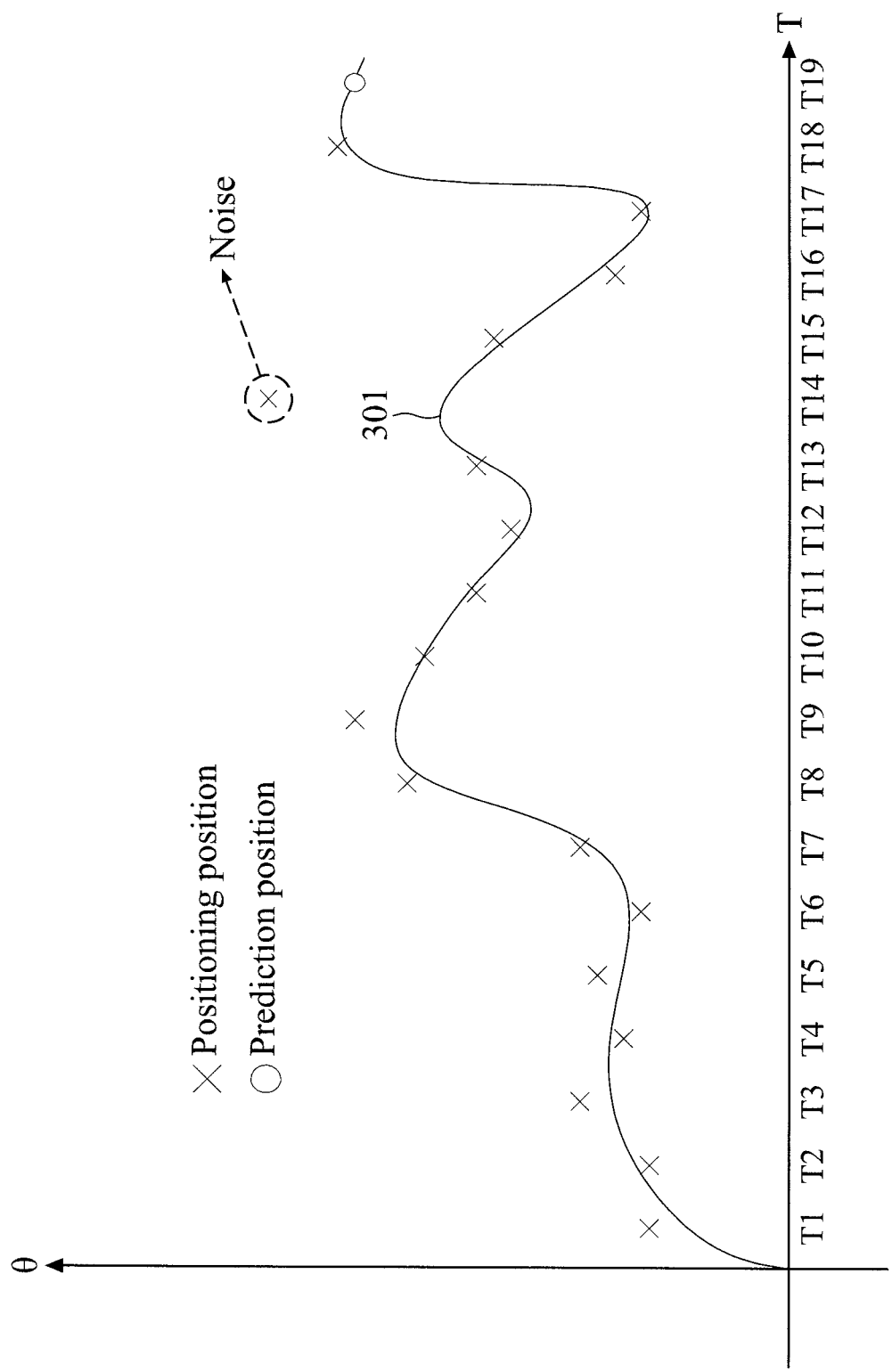
FIG. 3 shows a schematic view of a corresponding relationship of positioning positions, a prediction position and a regression curve according to an embodiment of the present invention.

FIG. 3 shows a schematic view of a corresponding relationship of positioning positions, a prediction position and a regression curve according to an embodiment of the present invention. In the embodiment, N is, for example, 18. As shown in FIG. 3, "x" indicates the positioning positions corresponding to sampling time points T1 to T18, and "o" indicates the prediction position corresponding to the sampling time point T19.

Please refer to FIG. 1 and FIG. 3. In the embodiment, after the eighteen (i.e., N) positioning positions corresponding to the sampling times T1 to T18 (i.e., T1 to TN), the processing unit 130 adds the eighteen (i.e., N) positioning positions to the calculation group. Then, the processing unit 130 performs the regression analysis of the eighteen (i.e., N) positioning positions in the calculation group to obtain a polynomial (such as a regression curve 301 in FIG. 3) corresponding to eighteen (i.e., N) positioning positions. Afterward, the processing unit 130 may predicts the prediction position corresponding to the sampling time point T19 (i.e., TN+1) using the regression curve 301.

In one embodiment, the sampling time range of the above N positioning positions is at least greater than one cycling period of the first wave signal or the second wave signal. In addition, the order of the above polynomial is determined according to a motion state of the device under test 210 (i.e., motor). For example, when the device under test 210 operates at a fixed speed or the speed variation of the device under test 210 is less than a predetermined range, the polynomial for predicting a positioning position of the next sampling time point TN+1 may be a linear polynomial.

Furthermore, when the operation of the device under test 210 has an acceleration or the difference between the positioning positions for each two sampling time points is larger, the polynomial used by the processing unit 130 for predicting the positioning position of the sampling time point TN+1 may adopt a quadratic polynomial. In the embodiment, the coefficients of the above polynomial may be obtained by a least squares algorithm. That is, the processing unit 130 may perform the regression analysis of the positioning positions in the calculation group to obtain the regression curve through the least square algorithm.

For example, since the change of the positioning positions corresponding to every two sampling time points in FIG. 3 is not fixed, the polynomial adopted by the processing unit 130 is the quadratic polynomial for obtaining the regression curve. In the embodiment, the sampling time range of the regression curve 301 may be T1 to T18 (i.e., TN) or only a predetermined time range corresponding to one cycling period. Then, after the regression curve 301 is obtained, the processing unit 130 may obtain the ideal position curve according to at least some of eighteen (i.e., N) positioning positions in the calculation group.

For example, the positioning positions corresponding to the sampling time points T1 to T6 (i.e., at least some of the N positioning positions in the calculation group) are taken as an example. The processing unit 130 may respectively calculate the changes between the positioning positions corresponding to the sampling time points T1 to T2, T2 to T3, T3 to T4, T4 to T5 and T5 to T6. The processing unit 130 divides the obtained changes between the positioning positions by five time intervals, so as to calculate average distances moved by the device under test 210 for each time interval. The above five time intervals are the intervals of the sampling time of the sampling time points T1 to T6. Then, the processing unit 130 may determine the ideal position curve according to the above average distances. In one embodiment, When the device under test 210 operates under the same environmental conditions, for example, within a sampling time corresponding to the ideal position curve, the rotational speed of the device under test 210 remains unchanged.

Furthermore, in another embodiment, the ideal position curve may also be generated by a user-defined equation. That is, the ideal position curve is not directly associated with the operation state of the device under test 210. Then, the processing unit 130 may determine the ideal position of the device under test 210 corresponding to the sampling time point T19 (TN+1) at the sampling time point T19 (TN+1) corresponding to nineteenth (i.e., (N+1)-th) prediction position according to the ideal position curve.

Then, the processing unit 130 subtracts the nineteenth (i.e., (N+1)-th) prediction position from the corresponding ideal position to obtain the corresponding error value according to the nineteenth (i.e., (N+1)-th) prediction position (i.e., "o" as shown in FIG. 3) corresponding to the sampling time point T19 (TN+1).

Afterward, the processing unit 130 may apply this error value to correct the device under test 210. For example, the processing unit 130 may output the driving signal to the driving unit 220 according to the error value, so that the driving unit 220 may correct the operation speed of the device under test 210 according to the driving signal corresponding to the error value, thereby improving the positioning accuracy. 100411 After the processing unit 130 applies the calculated error value to correct the device under test 210, the sampling unit 120 may further sample the nineteenth ((N+1)-th) positioning position corresponding to the sampling time point T19 (TN+1) and provides the nineteenth ((N+1)-th) positioning position to the processing unit 130. Then, the processing unit 130 may add the nineteenth ((N+1)-th) positioning position to the calculation group and delete the first positioning position in the calculation group to update the calculation group. At this time, the calculation group includes the N positioning positions from the second positioning position to the nineteenth positioning position. Wherein the second positioning position is served as the first positioning position in the calculation group and the nineteenth positioning position is served as the N-th positioning position in the calculation group.

Afterward, the processing unit 130 may repeat the regression analysis of the positioning positions (i.e., the second positioning position to the nineteenth positioning position) in the calculation group to obtain a new regression curve, and predict a twentieth positioning position according to the new regression curve. Then, the processing unit 130 may determine the ideal position of the device under test 210 at the time point of the twentieth positioning position according to the ideal position curve. Afterward, the processing unit 130 may apply the error value between the twentieth prediction position and the corresponding ideal position to correct the device under test 210. Other methods for correcting the device under test 210 and their operation may be discerned by analogy. In addition, the embodiment may continuously re-obtain the regression curve, re-obtain the next prediction position, re-obtain the ideal position corresponding to the time point of the next prediction position and re-apply the error value between the next prediction position and the corresponding ideal position to correct the device under test 210. Accordingly, the actual operation state of the device under test 210 is closer to the ideal state, thereby improving the accuracy of the operation thereof.

Furthermore, in one embodiment, the processing unit 130 may store the regression curve 301 obtained according to the positioning positions corresponding to the sampling time points T1 to T18 to the storage unit 140. The processing unit 130 subtracts the positioning positions corresponding to the sampling time points T1 to T18 from the ideal positions corresponding to the ideal position curve to obtain the corresponding error values. The processing unit 130 applies these error values to establish the error table. Then, after the device under test 210 is started, the processing unit 130 may predicts the next prediction position using the regression curve 301 previously stored, or correct the device under test 210 directly according to the error values in the error table, thereby decreasing the calculation time.

In the embodiment, before the regression curve 301 is obtained, the processing unit 130 further performs the filtering process on the eighteen positioning positions corresponding to the sampling time points T1 to T18 through the filter 134 to filter the noises generated by the positioning positions. Therefore, the regression curve 301 generated by the calculation unit 132 does not affected by the noises. For example, as shown in FIG. 3, the jitter of the positioning position corresponding to the sampling time point T14 is larger than the jitter of the positioning position corresponding to the sampling time point T13. After the filter 134 performs the filtering process on the above positioning positions, the noise of the positioning position corresponding to the sampling time point may be effectively eliminated. Therefore, the positioning position corresponding to the sampling time point T14 may be smoothed, so that the regression curve 301 as shown in FIG. 3 does not affected by the noise, thereby increasing the accuracy of the position correction.

Figure 4:
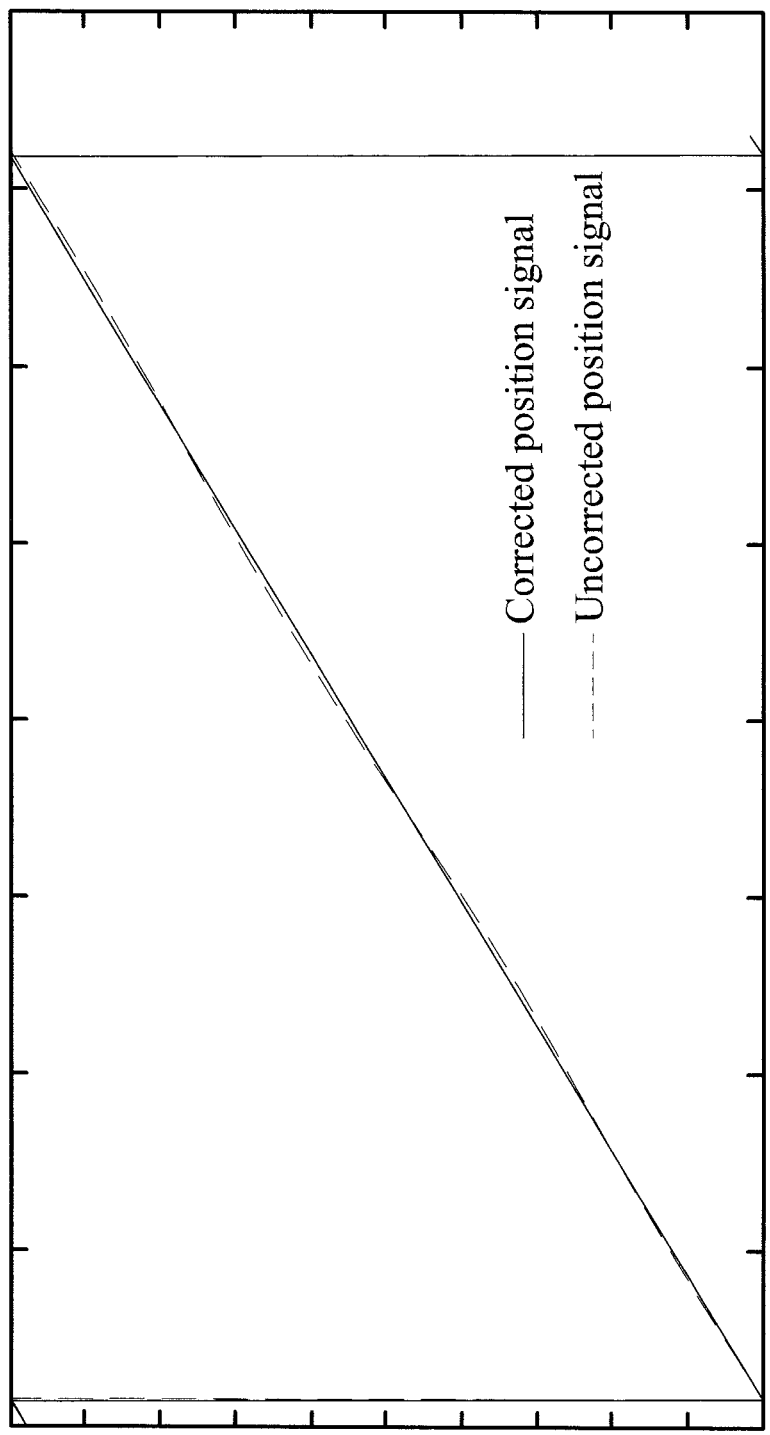
FIG. 4 shows a schematic view of a comparison of a corrected position signal and an uncorrected position signal according to an embodiment of the present invention.

FIG. 4 shows a schematic view of a comparison of a corrected position signal and an uncorrected position signal according to an embodiment of the present invention. As shown in FIG. 4, the error fluctuation of the uncorrected position signal is larger than the error fluctuation of the corrected position, and the corrected position signal is close to a straight line with a slope of the ideal state.

Figure 5:
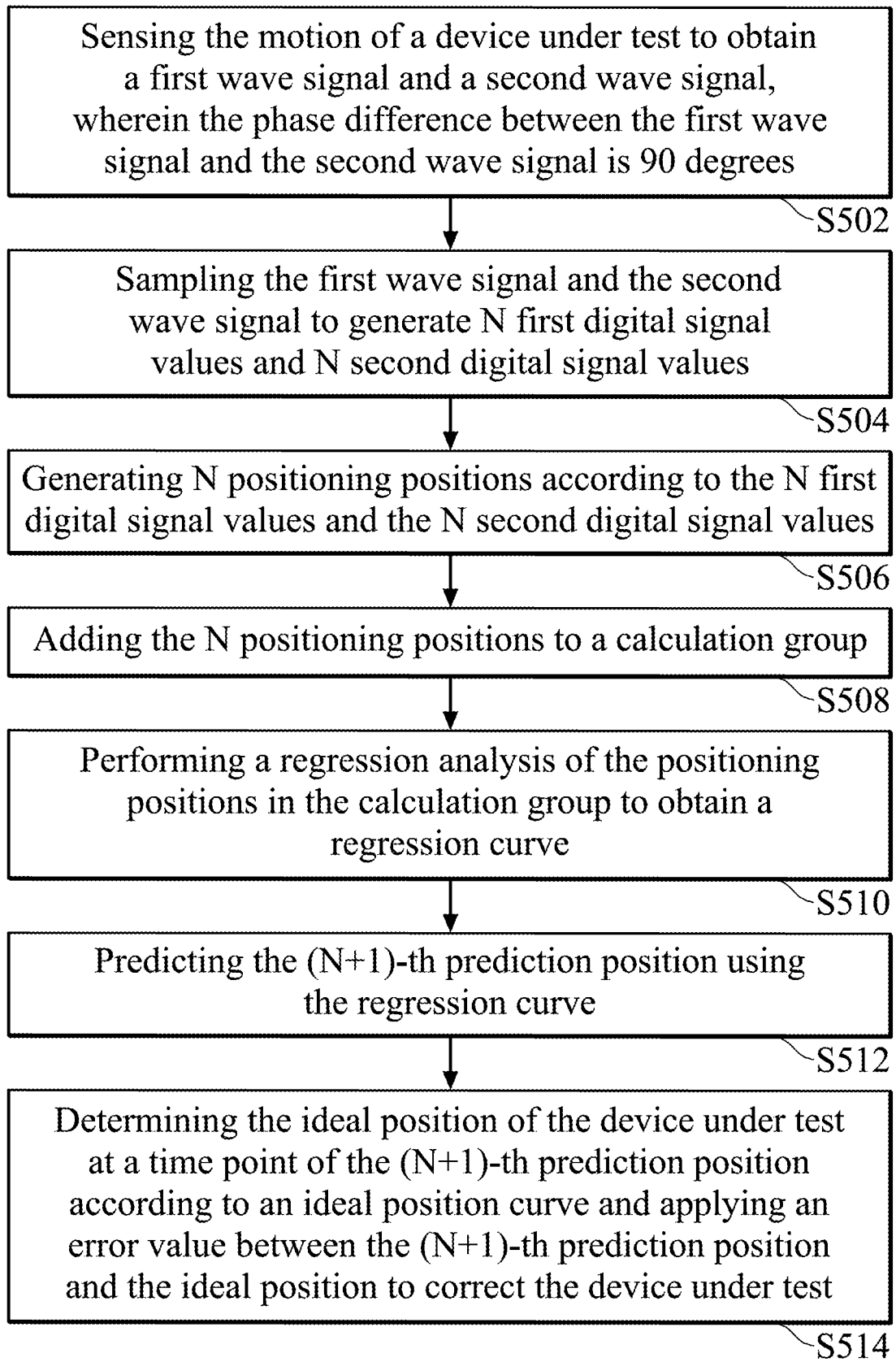
FIG. 5 shows a flowchart of an instant correction method for an encoder according to an embodiment of the present invention.

FIG. 5 shows a flowchart of an instant correction method for an encoder according to an embodiment of the present invention. In step S502, the method involves sensing the motion of a device under test to obtain a first wave signal and a second wave signal, wherein the phase difference between the first wave signal and the second wave signal is 90 degrees. In step S504, the method involves sampling the first wave signal and the second wave signal to generate N first digital signal values and N second digital signal values.

In step S506, the method involves generating N positioning positions according to the N first digital signal values and the N second digital signal values. In step S508, the method involves adding the N positioning positions to a calculation group. In step S510, the method involves performing a regression analysis of the positioning positions in the calculation group to obtain a regression curve. In step S512, the method involves predicting the (N+1)-th prediction position using the regression curve. In step S514, the method involves determining the ideal position of the device under test at a time point of the (N+1)-th prediction position according to an ideal position curve and applying an error value between the (N+1)-th prediction position and the ideal position to correct the device under test. In the embodiment, the ideal position curve is generated according to at least some of the positioning positions in the calculation group.

Figure 6:
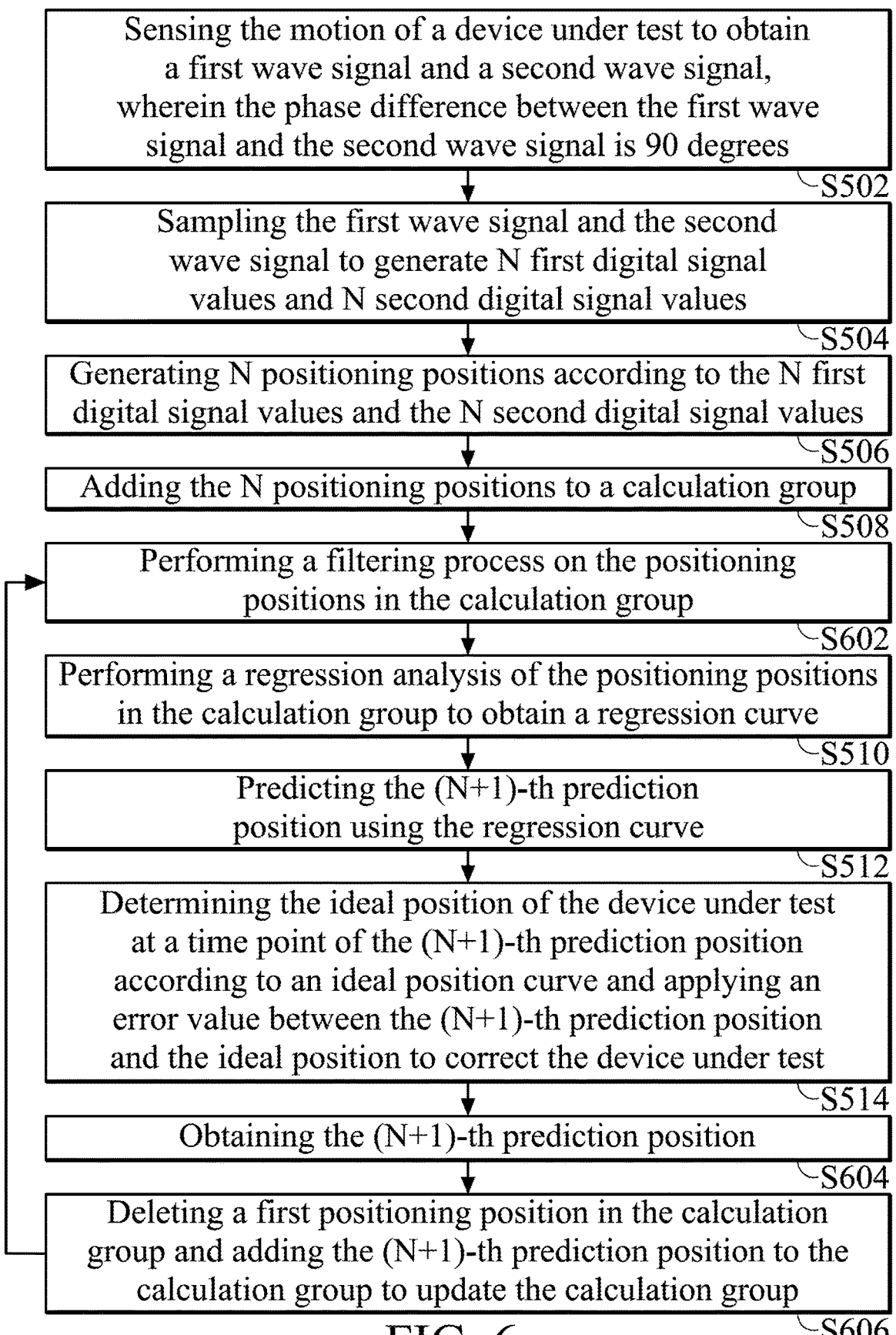
FIG. 6 shows a flowchart of an instant correction method for an encoder according to another embodiment of the present invention.

FIG. 6 shows a flowchart of an instant correction method for an encoder according to another embodiment of the present invention. In step S502, the method involves sensing the motion of a device under test to obtain a first wave signal and a second wave signal, wherein the phase difference between the first wave signal and the second wave signal is 90 degrees. In step S504, the method involves sampling the first wave signal and the second wave signal to generate N first digital signal values and N second digital signal values.

In step S506, the method involves generating N positioning positions according to the N first digital signal values and the N second digital signal values. In step S508, the method involves adding the N positioning positions to a calculation group. In step S602, the method involves performing a filtering process on the positioning positions in the calculation group. In step S510, the method involves performing a regression analysis of the positioning positions in the calculation group to obtain a regression curve. In step S512, the method involves predicting the (N+1)-th prediction position using the regression curve. In step S514, the method involves determining the ideal position of the device under test at a time point of the (N+1)-th prediction position according to an ideal position curve and applying an error value between the (N+1)-th prediction position and the ideal position to correct the device under test. In the embodiment, the ideal position curve is generated according to at least some of the positioning positions in the calculation group.

In step S604, the method involves obtaining the (N+1)-th prediction position. In step S606, the method involves deleting a first positioning position in the calculation group and adding the (N+1)-th prediction position to the calculation group to update the calculation group. Then, the method enters the step S602, the filtering process is performed on the positioning positions in the updated calculation group, the regression curve is re-obtained, the (N+1)th prediction position is re-predicted, the ideal position corresponding to the time point of the (N+1)-th prediction position is re-obtained, thereby continuing to correct the device under test.

It should be noted that the order of the steps of FIG. 5 and FIG. 6 is only for illustrative purpose, but not intended to limit the order of the steps of the present invention. The user may change the order of the steps above according the requirement thereof. The flowcharts described above may add additional steps or use fewer steps without departing from the spirit and scope of the present invention.

In summary, according to the instant correction method for the encoder and the system thereof, the N positioning positions corresponding to the device under test are obtained. The regression analysis is performed for the N positioning positions to obtain the regression curve and further predict the (N+1)-th prediction position. The ideal position of the device under test is determined at the time point corresponding to the (N+1)-th prediction position according to the ideal position curve and the error value between the (N+1)-th prediction position and the corresponding ideal position is applied to correct the device under test. In addition, the embodiment of the present invention may further obtain the (N+1)-th positioning position, re-obtain the regression curve, re-predict the (N+1)-th prediction position, re-determine the ideal position corresponding to the time point for predicting the (N+1)-th prediction position, and continue to correct the device under test. Therefore, the accuracy of the positioning position of the encoder may be effectively maintained at a certain range and the lifespan of the encoder may be also extended, thereby increasing the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An instant correction method for an encoder, comprising:
    sensing motion of a device under test to obtain a first wave signal and a second wave signal, wherein a phase difference between the first wave signal and the second wave signal is 90 degrees;
    sampling the first wave signal and the second wave signal to generate N first digital signal values and N second digital signal values;
    generating N positioning positions according to the N first digital signal values and the N second digital signal values;
    adding the N positioning positions to a calculation group;
    performing a regression analysis of the positioning positions in the calculation group to obtain a regression curve;
    predicting (N+1)-th prediction position using the regression curve; and
    determining an ideal position of the device under test at a time point of the (N+1)-th prediction position according to an ideal position curve and applying an error value between the (N+1)-th prediction position and the ideal position to correct the device under test.

2. The instant correction method for the encoder as claimed in claim 1, wherein the ideal position curve is generated according to at least some of the positioning positions in the calculation group.

3. The instant correction method for the encoder as claimed in claim 1, further comprising:
    obtaining the (N+1)-th prediction position;
    deleting a first positioning position in the calculation group and adding the (N+1)-th prediction position to the calculation group to update the calculation group; and
    performing the regression analysis of the positioning positions in the calculation group to obtain the regression curve.

4. The instant correction method for the encoder as claimed in claim 1, wherein the step of generating the N positioning positions according to the N first digital signal values and the N second digital signal values comprises:
    generating the N positioning positions according to the N first digital signal values and the N second digital signal values through a coordinate rotation digital computer algorithm or an inverse trigonometric function algorithm.

5. The instant correction method for the encoder as claimed in claim 1, wherein the step of performing the regression analysis of the positioning positions in the calculation group to obtain the regression curve comprises:
    performing the regression analysis of the positioning positions in the calculation group to obtain the regression curve through a least square algorithm.

6. The instant correction method for the encoder as claimed in claim 1, further comprising:
    performing a filtering process on the positioning positions before obtaining the regression curve.

7. An instant correction system for an encoder, comprising:
    a sensing unit, sensing motion of a device under test to obtain a first wave signal and a second wave signal, wherein a phase difference between the first wave signal and the second wave signal is 90 degrees;
    a sampling unit, sampling the first wave signal and the second wave signal to generate N first digital signal values and N second digital signal values; and
    a processing unit, generating N positioning positions according to the N first digital signal values and the N second digital signal values, adding the N positioning positions to a calculation group, performing a regression analysis of the positioning positions in the calculation group to obtain a regression curve, predicting (N+1)-th prediction position using the regression curve, determining an ideal position of the device under test at a time point of the (N+1)-th prediction position according to an ideal position curve and applying an error value between the (N+1)-th prediction position and the ideal position to correct the device under test.

8. The instant correction system for the encoder as claimed in claim 7, wherein the ideal position curve is generated according to at least some of the positioning positions in the calculation group.

9. The instant correction system for the encoder as claimed in claim 8, wherein the processing unit comprises:
    a first calculation unit, generating the N positioning positions according to the N first digital signal values and the N second digital signal values and adding the N positioning positions to the calculation group;

a second calculation unit, performing the regression analysis of the positioning positions in the calculation group to obtain the regression curve; and a correction unit, predicting the (N+1)-th prediction position using the regression curve, determining the ideal position of the device under test at the time point of the (N+1)-th prediction position according to the ideal position curve and applying the error value between the (N+1)-th prediction position and the ideal position to correct the device under test.

10. The instant correction system for the encoder as claimed in claim 7, wherein the processing unit further obtains the (N+1)-th prediction position, deletes a first positioning position in the calculation group and adds the (N+1)-th prediction position to the calculation group to update the calculation group, the processing unit repeats the regression analysis of the positioning positions in the calculation group to obtain the regression curve, the processing unit re-predicts the (N+1)th prediction position using the regression curve, the processing unit re-determines the ideal position of the device under test at the time point of the (N+1)-th prediction position according to the ideal position curve and re-applies the error value between the (N+1)-th prediction position and the ideal position to correct the device under test.

11. The instant correction system for the encoder as claimed in claim 7, wherein the processing unit further generates the N positioning positions according to the N first digital signal values and the N second digital signal values through a coordinate rotation digital computer algorithm or an inverse trigonometric function algorithm.

12. The instant correction system for the encoder as claimed in claim 7, wherein the processing unit further performs the regression analysis of the positioning positions in the calculation group to obtain the regression curve through a least square algorithm.

13. The instant correction system for the encoder as claimed in claim 7, wherein the processing unit further performs a filtering process on the positioning positions before obtaining the regression curve.

* * * * *